United States Patent
Wolf, Jr. et al.

[11] Patent Number: 5,218,776
[45] Date of Patent: Jun. 15, 1993

[54] FISHING LINE TENSIONING APPARATUS FOR ATTACHMENT TO A FISHING POLE

[76] Inventors: Leonard H. Wolf, Jr.; Lu Cile W. Kearse, both of 1109 N. Sunrise Way, Palm Springs, Calif. 92262

[21] Appl. No.: 885,895

[22] Filed: May 20, 1992

[51] Int. Cl.⁵ .............................................. A01K 87/00
[52] U.S. Cl. .................................................... 43/25
[58] Field of Search ............... 43/25; 242/106, 129.8, 242/156.1

[56] References Cited

U.S. PATENT DOCUMENTS

| | | | |
|---|---|---|---|
| 1,709,436 | 4/1929 | Koester | 43/25 |
| 2,233,311 | 2/1941 | Harne | 43/25 |
| 2,519,257 | 8/1950 | Legner | 43/25 |
| 2,791,858 | 5/1957 | Kernodle | 43/25 |
| 2,804,711 | 9/1957 | Kozar | 43/25 |
| 2,846,804 | 8/1958 | Elliott | 43/25 |
| 3,053,004 | 9/1962 | Baker | 43/25 |
| 3,057,106 | 10/1962 | Wheeler | 43/25 |
| 3,545,119 | 12/1970 | Murnan | 43/25 |

Primary Examiner—Kurt C. Rowan
Attorney, Agent, or Firm—Donald A. Kettlestrings

[57] ABSTRACT

Apparatus for applying tension to a fishing line as the line is transferred from a supply to a fishing reel mounted on a fishing pole includes first and second opposed bar members for clamping the apparatus to a fishing pole and a third bar member cooperating with the second bar member for adjustably applying force against the fishing line as the line passes between the second and third bar members.

13 Claims, 1 Drawing Sheet

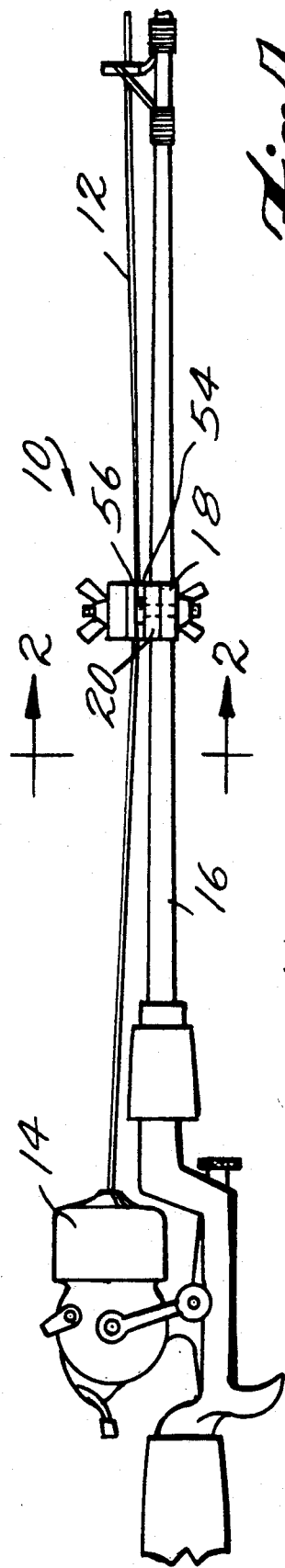

FISHING LINE TENSIONING APPARATUS FOR ATTACHMENT TO A FISHING POLE

This invention relates to a fishing line tensioning apparatus and more particularly to such apparatus which can be quickly and easily attached to and removed from a fishing rod for the purpose of applying tension to a fishing line as the line is transferred from a supply to a fishing reel mounted on the fishing pole.

When new fishing line is to be transferred from a supply spool to a fishing reel mounted on a fishing pole, it is necessary to control the tension on the line during the transferring process.

It is, therefore, an object of the present invention to provide a fishing line tensioning apparatus.

Another object is to provide such an apparatus which can be quickly and easily attached to and removed from a fishing pole.

A further object of the invention is the provision of such apparatus which is adjustable to accommodate any size fishing line.

Still another object is to provide such an apparatus which enables the tension on the fishing line to be quickly and easily adjusted.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides first and second opposed bar members, each defining upper and lower surfaces; the upper surface of the first bar member defines a first concave surface portion for receiving the fishing pole; the lower surface of the second bar member defining a second concave surface portion for receiving the fishing pole in cooperation with the first concave surface portion; first means are provided in operative relationship with the bar members for removably clamping the pole in position between the concave surface portions; a third bar member defines a lower surface; and second means are provided in operative relationship with the second and third bar members for adjustably applying force against the fishing line as the line passes between the second and third bar members.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is a fragmentary side elevation view of a fishing pole and reel and with the apparatus of the invention attached to the fishing pole;

FIG. 2 is a view taken along the line 2—2 in FIG. 1 and looking in the direction of the arrows;

FIG. 3 is a top plan view of the tensioning apparatus mounted on a fishing pole;

FIG. 4 is a bottom plan view of a second bar member in the tensioning apparatus;

FIG. 5 is a top plan view of a first bar member in the tensioning apparatus; and FIG. 6 is a fragmentary perspective view of a pad member of the tensioning apparatus.

With reference now to the drawings, wherein like reference characters designate like or corresponding parts throughout the several views, there is shown apparatus 10 for applying tension to a fishing line 12 as the line is transferred from a supply (not shown) to a fishing reel 14 mounted on a fishing pole 16.

Apparatus 10 comprises first and second opposed bar members 18, 20, each defining an upper surface 18′, 20′, respectively, and a lower surface 18″, 20″, respectively.

Upper surface 18′ of bar member 18 defines a first concave surface portion 22 for receiving fishing pole 16. Likewise, lower surface 20″ of bar member 20 defines a second concave surface portion 24 for receiving and grasping fishing pole 16 in cooperation with concave surface portion 22.

First means 26 are provided in operative relationship with bar members 18, 20 for removably clamping pole 16 in position between concave surface portions 22, 24. A third bar member 28 preferably defines a substantially flat lower surface 30, and second means 32 are provided in operative relationship with bar members 20 and 28 for adjustably applying force against fishing line 12 as the line passes between bar members 20, 28.

Upper surface 20′ of bar member 20 is preferably substantially flat, and first means 26 includes first and second openings 34, 34′ defined within first bar member 18 and first and second openings 36, 36′ defined within second bar member 20. First means 26 further includes first and second fastening elements 38, 40. Fastening element 38 extends through openings 34, 36, and fastening element 40 extends through openings 34′, 36′. Each of fastening elements 38, 40 preferably includes a threaded bolt and wing nuts 38′, 40′ which are threaded onto bolts 38, 40, respectively.

Second means 32 includes third openings 42, 44 defined within bar members 20, 28, respectively, and fourth openings 46, 48 defined within bar members 20, 28, respectively. Third fastening element 50 extends through openings 42, 44 in bars 20, 28, respectively, and fourth fastening element 52 extends through openings 46, 48 in bar members 20, 28, respectively. Fastening elements 50, 52 each include a threaded bolt and wing nuts 50′, 52′ are threaded onto each of bolts 50, 52, respectively.

Apparatus 10 also preferably includes first and second pad members 54, 56 positioned between bar members 20, 28 for frictionally engaging fishing line 12 as the line passes through apparatus 10 from the fishing line supply (not shown) to reel 14. Each of pad members 54, 56 defines a fifth opening 54′, 56′, respectively, and a sixth opening 54″, 56″, respectively, therein for receiving fastening elements 50, 52, as illustrated in the figures.

Bar members 20, 28 and pad members 54, 56 are all substantially equal in width to each other, and bar member 28 is substantially equal in length to each of pad members 54, 56. First and second openings 34, 34′ within bar member 18 and first and second openings 36, 36′ within bar member 20 are spaced apart from each other by a distance greater than the lengths of bar member 28 and pad members 54, 56 to enable bar member 28 and pad members 54, 56 to be positioned between heads 38″, 40″ of threaded bolts 38, 40. Alternatively, each of openings 36, 36′ can be countersunk at surface 20′ so bolt heads 38″, 40″ will be flush with or below surface 20′.

Third and fourth openings 42, 46 within bar member 20 are preferably countersunk at lower surface 20" of bar member 20 to receive heads of bolts 50, 52 and to permit bar members 18, 20 to be positioned with surfaces 18', 20" contacting each other. This enables concave surface portions 22, 24 to tightly engage a fishing pole 16 of small diameter.

Each of pad members 54, 56 is preferably comprised of rubber, and bar members 18, 20 and 28 are preferably comprised of plastic.

In use, apparatus 10 is attached to fishing pole 16. Pole 16 is positioned in contact with concave surface portion 24 of bar member 20, and bar member 18 is positioned onto bolts 38, 40 by passing the bolts through openings 34, 34' within bar member 18. Wing nuts 38', 40' are tightened on bolts 38, 40 until concave surface portions 22, 24 tightly engage and grasp fishing pole 16.

Wing nuts 50', 52' are loosened to permit fishing line 12 to be passed between pad members 54, 56 and from the fishing line supply (not shown) to reel 14. The desired tension is applied to line 12 by tightening wing nuts 50', 52' on bolts 50, 52. As a result, bar member 28 cooperates with upper surface 20' of bar member 20 and with pad members 54, 56 to grasp fishing line 12 between pad members 54, 56 so that line 12 passes through pad members 54, 56 in frictional engagement therewith. The amount of force applied to line 12 by pad members 54, 56 can be quickly and easily adjusted by adjustment of wing nuts 50', 52' on bolts 50, 52.

This invention provides a fishing line tensioning apparatus which can be quickly and easily attached to and removed from a fishing rod for the purpose of applying tension to a fishing line as the line is transferred from a supply to a fishing reel mounted on the fishing pole.

The invention in its broader aspects is not limited to the specific details shown and described, and departures may be made from such details without departing from the principles of the invention and without sacrificing its chief advantages.

What is claimed is:

1. Apparatus for applying tension to a fishing line as the line is transferred from a supply to a fishing reel mounted on a fishing pole, said apparatus comprising:

first and second opposed bar members, each defining upper and lower surfaces;

said upper surface of said first bar member defining a first concave surface portion for receiving said fishing pole;

said lower surface of said second bar member defining a second concave surface portion for receiving said fishing pole in cooperation with said first concave surface portion;

first means in operative relationship with said bar members for removably clamping said pole in position between said concave surface portions;

a third bar member defining a lower surface and positioned with respect to said second bar member for receiving said fishing line between said lower surface of said third bar member and said second bar member; and second means in operative relationship with said second and third bar members for adjustably applying force against said fishing line as said line passes between said second and third bar members.

2. Apparatus as in claim 1 wherein said supper surface of said second bar member and said lower surface of said third bar member are substantially flat.

3. Apparatus as in claim 2 wherein said first means includes first and second openings defined within each of said first and second bar members and first and second fastening elements extending through said first and second openings, respectively.

4. Apparatus as in claim 3 wherein said second means includes third and fourth openings defined within each of said second and third bar members and third and fourth fastening elements extending through said third and fourth openings, respectively.

5. Apparatus as in claim 4 further including first and second pad members positioned between said second and third bar members for frictionally engaging said fishing line as said line passes through said apparatus from said supply to said reel.

6. Apparatus as in claim 5 wherein each of said pad members defines fifth and sixth openings therein for receiving said third and fourth fastening elements, respectively.

7. Apparatus as in claim 6 wherein said second and third bar members and said first and second pad members are all substantially equal in width to each other.

8. Apparatus as in claim 7 wherein said third bar member and said first and second pad members are all substantially equal in length to each other.

9. Apparatus as in claim 8 wherein said first and second openings within each of said first and second bar members are spaced apart from each other by a distance greater than the length of said third bar member and said first and second pad members.

10. Apparatus as in claim 9 wherein said third and fourth openings within said second bar member are countersunk at said lower surface of said second bar member.

11. Apparatus as in claim 10 wherein said first, second, third and fourth fastening elements each include threaded bolts and wing nuts threaded onto each of said bolts.

12. Apparatus as in claim 11 wherein each of said pad members is comprised of rubber.

13. Apparatus as in claim 12 wherein said first, second and third bar members are comprised of plastic.

* * * * *